INVENTOR.
Charles E. Woodard
Richard J. Morcom
BY
Attorney

INVENTOR.
Charles E. Woodard
BY Richard J. Morcom

Attorney

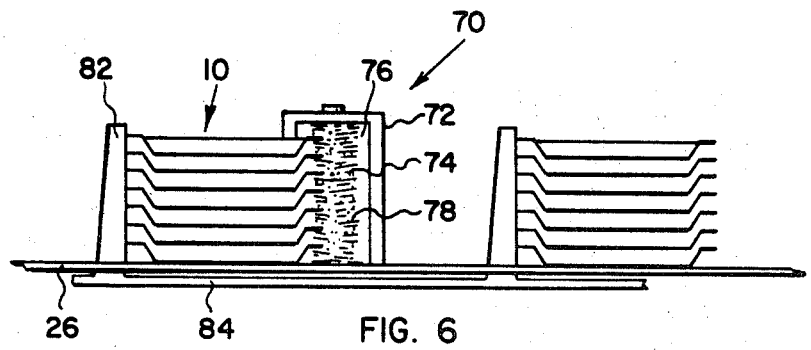
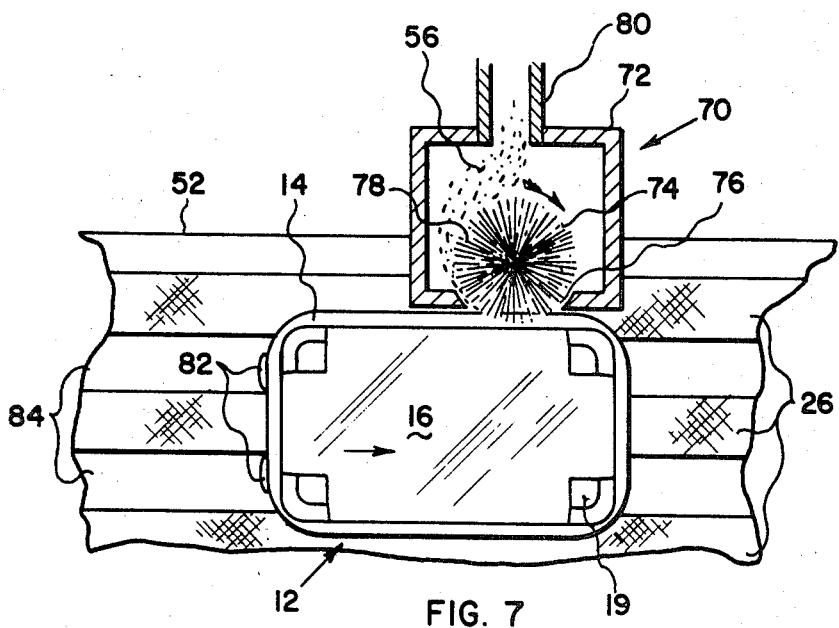

United States Patent Office 3,578,734
Patented May 11, 1971

3,578,734
METHOD FOR TREATING THE FLANGES OF CONTAINERS
Charles Elbert Woodard, 14 Elizabeth St., South Windsor, Conn. 06074, and Richard James Morcom, 44 High Farms Road, West Hartford, Conn. 06107
Filed Nov. 19, 1968, Ser. No. 777,030
Int. Cl. B29c 25/00; B29f 5/00
U.S. Cl. 264—80                                     12 Claims

ABSTRACT OF THE DISCLOSURE

Containers of synthetic plastic material having an outwardly extending flange about at least a portion of their periphery are stacked in nested relationship with a relatively small spacing between their flanges and are subjected to a flame treatment by an angularly disposed flame along the outer edge of the flange to eliminate jagged edges and whiskers. The heating produces a bead of increased thickness at the flnage edge to provide a smooth surface.

BACKGROUND OF THE INVENTION

In recent years there has been ever increasing utilization of thermoformed containers of synthetic plastic material for various packaging applications. Among the most widely utilized container forms are trays which may be overwrapped with a film of synthetic plastic material to provide an attractive and hygienic container affording the opportunity to display the goods either partially or in their entirety if the tray is formed of a transparent material.

As is well known, various techniques are employed for the thermo-forming and finishing of the containers from the basic sheet stock. From the standpoint of speed and economy of operation, the thermoforming technique which has achieved very widespread application involves the forming of the container depressions in a long length of the sheet material at one stage, usually several across the width of the sheet material, by means of multicavity dies, and the use of the web between the container cavities to carry the partially formed containers to a subsequent stage where the sheet material is treated to separate the container from the web of material about them. Generally, the forming dies also include cooperating surfaces providing a cutting knife edge and bed to cut substantially through the thickness of the synthetic plastic material so that the tray forms may be separated from the web at a subsequent stage simply by flexing the sheet material or otherwise applying a separating pressure.

Since the cutting dies tend to wear and since the material is, in fact, not cut through cleanly at the time of separation, there is a tendency for the crushing and fracturing to produce jagged edges, whiskers and other particles of the synthetic plastic along the edge or flange of the container, such defects hereinafter being referred to individually and collectively as "edge defects."

This tendency is particularly pronounced when the material is biaxially oriented to achieve great strength at relatively low cost per pound of material. The jagged edge of the container represents a potential problem in that it may subsequently cut through a film overwrapped about the container and it and the whiskers may be unpleasant to the touch of the customer. Moreover, particles of plastic adjacent the edge may contaminate the contents of the container or provide a gritty feel to the customer.

It will be appreciated that the problems of slivers or crushing may be avoided by hot die or wire cutting but such a step would involve elimination of the web as a carrier for the many container units being formed or additional equipment of substantial complexity and cost and a likelihood of an increase in overall process time. Thus, it can be seen that any additional steps to be performed on the trays are desirably performed outside of that type of existing thermoforming equipment which makes use of the web of the sheet material as a carrier for the molded containers and at a speed sufficient to avoid any delay in high speed or inline thermoforming operations.

It is an object of the present invention to provide a novel method for treating the flanges of synthetic plastic containers so as to provide a substantially smooth outer edge and which method is adapted to high speed operation.

It is also an object to provide such a method which also removes any synthetic plastic particles formed by the separating and forming operations and deposited on the surfaces of the flange adjacent the other edge.

Another object is to provide such a method in which a large number of containers may be so treated in nested relationship at high speed and with a relatively high degree of economy.

SUMMARY OF THE INVENTION

It has now been found that the foregoing and related objects may be readily attained by a method wherein a multiplicity of containers having a laterally projecting flange about at least a portion of the periphery thereof are stacked in nested relationship to provide spacing between their flanges of about $\frac{1}{32}-\frac{1}{4}$ inch and a flame is caused to contact the outer edge of the flanges at an angle thereto for an abbreviated period of time sufficient to produce physical changes in the outer edge portion and to produce a bead of greater thickness thereat and eliminate projecting portions of synthetic plastic material therefrom such as jagged edges and whiskers. The spacing between the flanges of adjacent containers in the stack and the angular disposition of the flame in cooperation with the gas pressure therein substantially limit penetration of the flame between adjacent flanges and contact with the outer edge portions to about $\frac{1}{100}-\frac{1}{4}$ inch inwardly from the edge.

The process of the present invention is particularly beneficially employed with containers of biaxially oriented material since the flame need not produce complete fusion of the flange edge portion but can take advantage of the deorientation or shrinkage of the portion heated above its orientation temperature to produce a thickening and restructuring of the outer edge portion. To minimize contamination of the container by synthetic plastic particles and facilitate operation and provide a smoother surface on the flange, the surface of the flanges adjacent the flame treated edge is desirably brushed; and most desirably a gas is caused to flow outwardly across the surface of the flange concurrently with such brushing.

The technique of the present invention is readily adapted to the treatment of a large number of trays stacked in nested relationship with spacing between their flanges, since such a stacked arrangement provides a heat sink preventing overheating of the flange and also limits the depth of penetration of the flame inwardly of the outer edge of the flanges. The trays may be passed vertically by the flame treating stations, or most desirably they are passed in a horizontal path thereby.

BRIEF DESCRIPTION OF THE DRAWINGS

FIG. 6 is a partially diagrammatical, fragmentary side elevational view of a brushing section desirably employed in another embodiment of the apparatus; and FIG. 7 is a partially diagrammatical top view of the brushing apparatus acting upon the surface and edges of the flanges of a stack of trays.

DETAILED DESCRIPTION OF THE ILLUSTRATED EMBODIMENT

Figure 1:
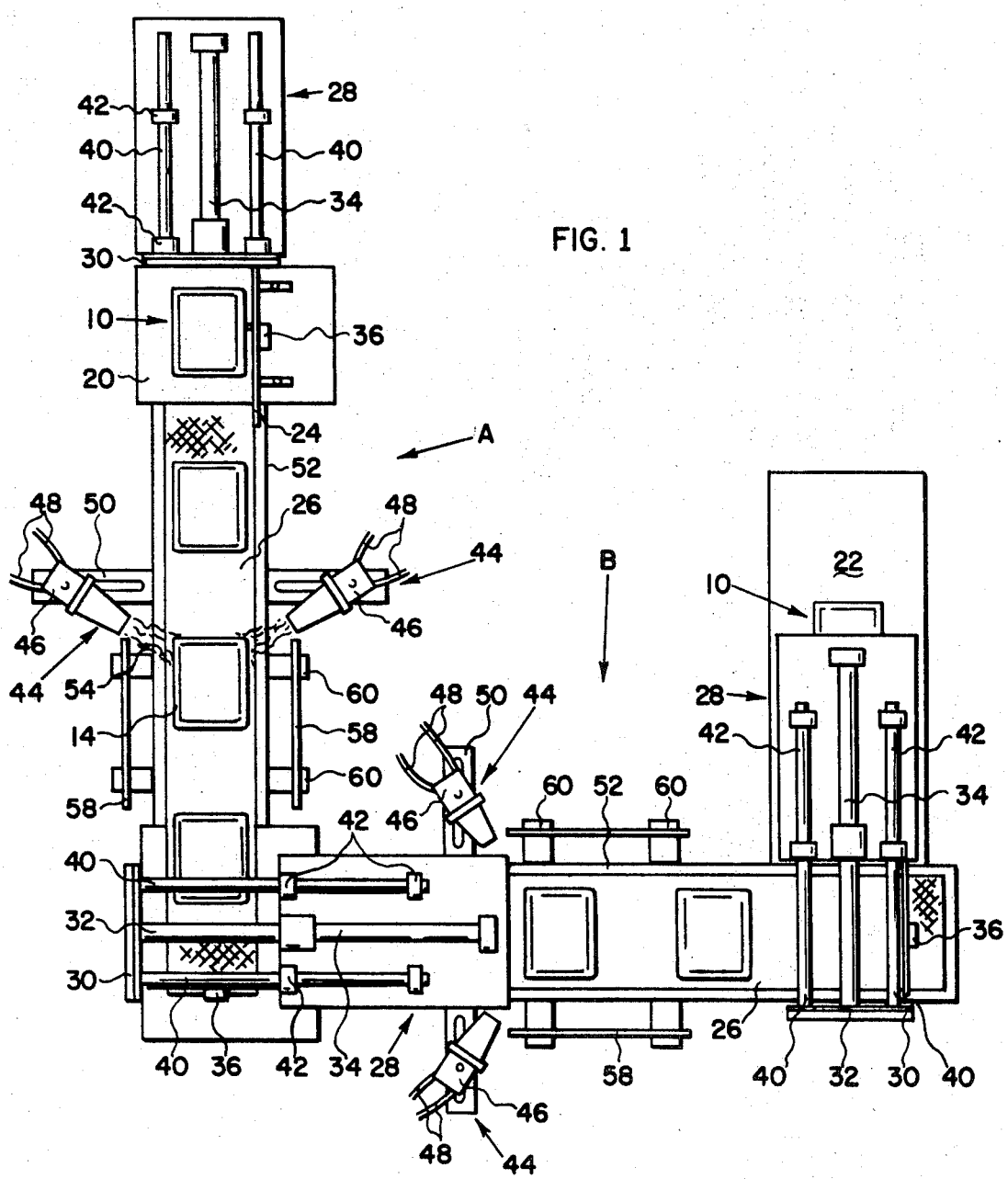
FIG. 1 is a plan view of apparatus embodying the present invention and showing stacks of trays at various points along the flow path through the apparatus.
Figure 3:
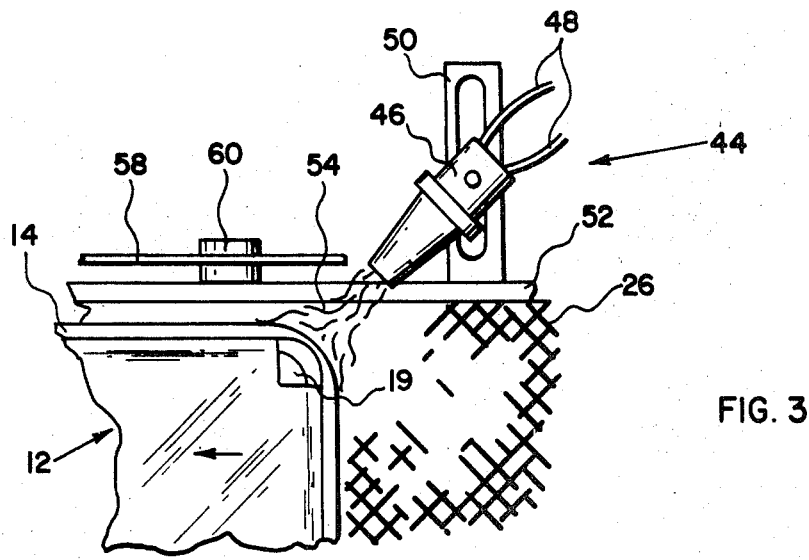
FIG. 3 is a partially diagrammatical fragmentary top view of the flame treating apparatus treating the trailing corner of a stack of trays.
Figure 4:
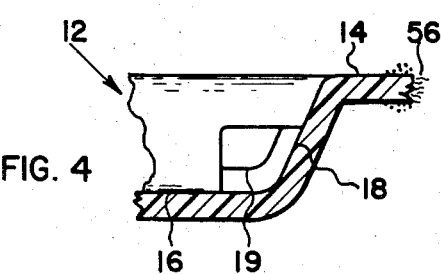
FIG. 4 is a fragmentary sectional view to an enlarged scale of a single tray showing the flange with a typical jagged edge and particles on its surfaces.

Turning now in detail to the attached drawing, FIG. 1 illustrates apparatus embodying the present invention which permits treatment of all four sides of stacks of trays generally designated by the numeral 10. As best seen in FIGS. 3 and 4, the individual trays are generally designated by the numeral 12 and are of generally rectangular cross section with a flange 14 extending laterally outwardly about the periphery thereof but greatly reduced in width, or eliminated entirely, at the rounded corners. As seen in FIG. 4, the tray has a bottom wall 16 and a sidewall 18 extending upwardly at an angle therefrom with the laterally extending flange 14 at the upper end thereof. To provide a spacing between the flanges 14 of adjacent trays 12 in the stacked or nested condition, the sidewall 18 is provided with stepped portions 19 adjacent the corners which provide a shelf seating the bottom wall 16 of the overlying tray 12. Details of preferred tray configurations are set forth in copending United States patent application Ser. No. 684,417, filed Nov. 20, 1967, by Donald W. Donovan, now Pat. No. 3,420,431, and assigned to the same assignee as the present invention.

The illustrated apparatus is generally comprised of two right angularly disposed conveyor sections A and B preceded by a feed table 20 and followed by a discharge table 22. Initially, a multiplicity of trays 12 is provided as a stack 10 on the feed table 20, either manually or preferably automatically, and caused to bear against the back plate 24 to effect alignment thereof. In this embodiment, the conveyor sections A and B each include a continuous conveyor belt 26 of open mesh wire construction which rotates about pulley units (not shown) driven by suitable means (not shown).

The stack of trays 10 which has been aligned against the back plate 24 of the feed table 20 operates the limit switch 36 and is moved onto the conveyor belt 26 by the transfer unit generally designated by the numeral 28.

In the illustrated embodiment, the transfer unit 28 is generally disposed above and to the upstream side of the feed table 20. Similar transfer units are provided at the ends of the belts 26 in cooperation with limit switches 36 at the stop plates 38. However, the transfer units 28 at the ends of the conveyor sections A and B operate in reverse fashion. Each transfer unit includes a vertically extending pusher plate 30 supported on the piston rod 32 which reciprocates within the piston cylinder 34 operated by air or other suitable fluid medium from a source (not shown). The transfer unit 28 at the feed table 20 is controlled by the limit switch 36 thereon to drive the piston rod 32 to the piston extended position (not shown) and is then automatically retracted to the position shown in FIG. 1 of the drawings. The movement of the pusher plate 30 is stabilized by the shafts 40 which are slidably supported in the blocks 42 of the transfer unit 28. When the piston cylinder 34 of the transfer unit 28 at the feed table 20 is operated by the limit switch 36, the pusher plate 30 abuts against the upstream side of the stack 10 of trays and pushes the stack 10 from the feed table 20 onto the conveyor belt 26 of the conveyor section A.

Figure 2:
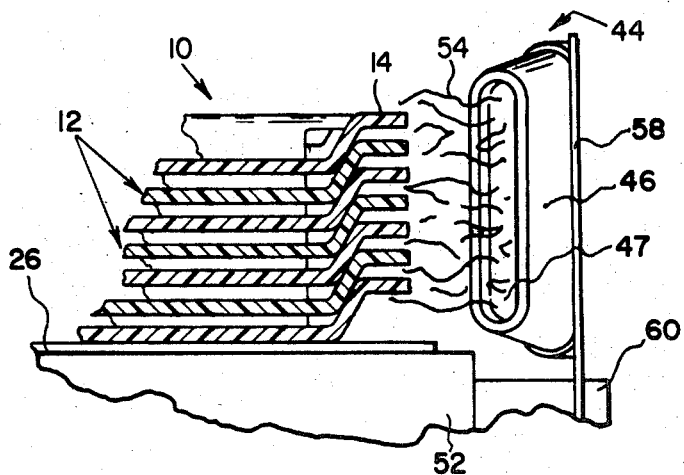
FIG. 2 is a partially diagrammatical, fragmentary front elevational view of the first flame treating section of the apparatus treating a stack of trays along one side thereof.
Figure 5:
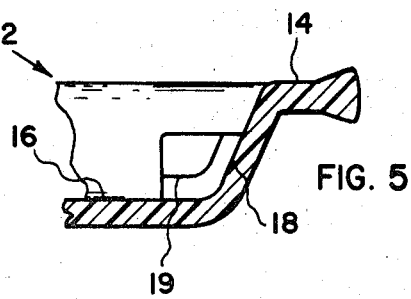
FIG. 5 is a similar view showing the flange after the flame treating step.

As the stack 10 of trays is moved along by the conveyor belt 26, it passes through a flame treating section comprised of a pair of gas burner units each generally designated by the numeral 44. The burner unit 44 includes a gas burner 46 with an elongated narrow burner aperture 47 adjacent the conveyor belt 26 and feed lines 48 for gas and air or oxygen controlled by suitable valves (not shown). The burner 46 is adjustably mounted by suitable means (not shown) on slide brackets 50 supported on the frame 52 of the apparatus so that it may be moved inwardly or outwardly with respect to the conveyor belt 26. By controlling the pressure in the feed lines 48 and the adjustment of the burner 42 on the slide brackets 50, the flame 54 is caused to contact the outer edge portion of the flanges 14 of the trays 12 in the stack 10 passing thereby. As best seen in FIG. 2, the flame 54 is limited in the depth of penetration between the adjacent flanges 14 but does act on the outer edge portion to eliminate jagged edges and whiskers 56 of plastic therefrom as seen in FIG. 5.

The illustrated angular disposition of the burners 46 relative to the flanges 14 of the containers serves to limit the depth of penetration of the flame 54 inwardly between the flanges 14 while at the same time ensuring a relatively broad scope of action upon the outer edge of the flanges 14. In addition, the angularly disposed flame 54 effectively acts upon the major portion of the corners of the trays 12 at the trailing side as is seen in FIG. 3.

To minimize the effect of air currents upon the operation of the burner units 44 and to protect the operator of the apparatus, heat shields 58 are provided outwardly of the sides of the conveyor belt 26. To facilitate adjustment, the heat shields 58 may be slidably supported on the support bars 60 which in turn are mounted on the apparatus frame 52.

As the conveyor belt 26 continues to carry the stack 10 of trays, the path of movement brings the stack 10 against the stop plate 38 at the end of the conveyor section A and the stack 10 strikes the limit switch 36 thereon actuating the transfer unit 28. In the illustrated embodiment, the transfer unit 28 is generally disposed above the conveyor belt 26 of the conveyor belt 26 of the conveyor sections A and B and the pusher plate 30 is drawn by the piston rod 32 towards the piston cylinder 34 or to the piston retracted position and then automatically returned to the piston extended position shown in FIG. 1 of the drawings. Thus, when the piston cylinder 34 is operated by the limit switch 36, the pusher plate 30 abuts against the side of the stack 10 of trays and pushes the stack 10 from the conveyor belt 26 of the section A onto the conveyor belt 26 of the section B.

The conveyor belt 24 of the conveyor section B now begins to carry the stack 10 of trays 12 along the length thereof. The previously untreated sides of the container stack 10 are now exposed to the action of the flames 54 of the burner units 44 so that all four sides are thus treated.

In the embodiment illustrated in FIGS. 6 and 7, the stack 10 of trays passes from the flame treating section to a brushing section comprised of a pair of brushing units generally designated by the numeral 70 desirably adjustably mounted on the apparatus frame 52 and each having a housing 72 with a brush 74 rotating therein about an axis perpendicular to the conveyor belt 26. As best seen in FIG. 6 the housing 72 has an elongated aperture 76 in its inner face adjacent the conveyor belt 26 and the brush 74 has filamentary or bristlelike elements 78 defining its periphery and which project outwardly through the aperture 76 so as to project inwardly of the outer edges of the flanges 14 between the trays 12. Since the brushes 74 are rotating in a direction opposite to the path of movement of the stack 10 of trays 12, the bristlelike elements 78 remove any synthetic plastic particles 56 thereon and propel them into the housing 72. The housing 72 is a substantially airtight enclosure with the brush 74 and aperture 76 being cooperatively dimensioned and configured to minimize the spacing therebetween. A fitting 80 on the housing is connected to a suitable source of vacuum or negative pressure (not shown) which causes air to flow over the surface of the flanges 12 and into aperture 76, thus minimizing any tendency for the particles 56 to pass into the interior of the trays 12 or to be scattered into the atmosphere. The particles 56 will generally be conveyed by the stream of air through the fitting 80, and the stream of air is passed through suitable means for removing particulate matter (not shown) such as a bag-type filter or cyclone separator.

To provide positive driving action for the tray stack 10 past the brushing units 70, fingers 82 are provided on an internal belt 84 and extend up through the conveyor belt 26. Other suitable means for providing positive driving action can be employed.

The continuing movement of the conveyor belt 26 causes the stack 10 to abut against the stop plate 38 and strike the limit switch 36 producing actuation of the transfer unit 28 constructed and operating similarly to that previously described. This, in turn, results in movement of the stack 10 of trays 12 from the conveyor belt 26 of the section B onto the discharge table 22 from which it may be transferred either manually or automatically.

The process and apparatus of the present invention are applicable to containers formed of various synthetic plastics and preferably thermoplastics. Exemplary materials are the polyolefins such as polyethylene, ethylene-propylene copolymers and isotactic polypropylene, polyacrylates, polymethacrylates, polycarbonates, polyvinyl chloride, polyethylene terephthalates and styrene polymers. The preferred thermoplastics are styrene polymers such as polystyrene, impact polystyrene, ABS and styrene/acrylonitrile copolymers. Of the various polymers, biaxially oriented materials are preferred since they enable bead formation upon heating only to above the orientation temperature. Of the biaxially oriented polymers, biaxially oriented polystyrene is most desirably utilized because of its excellent toughness and resilience even in thin sections and because of its relatively inert qualities with respect to foods and other materials.

Most usually, the containers will be thermoformed from synthetic plastic sheet material in order to achieve fabrication at the greatest possible rates of speed and with the greatest economy. The sheet material may be biaxially oriented prior to thermoforming or it may be oriented by the forming operation itself. The actual configuration of the container and of the flange is not critical since the apparatus and process may be modified to accommodate substantially any type of configuration. However, for most facile operation, the container will normally be polygonal and preferably rectangular in cross section although it may have rounded corners as in the illustrated embodiment. The technique of the present invention is also applicable to injection molded or blow molded containers to remove flash and other projecting portions about any flange provided thereon.

As will be readily appreciated, the total amount of heat imparted to the flange and the surface area with which the flame comes into contact must be closely controlled to avoid excessive fusion and/or deorientation of the synthetic plastic material. By providing the trays in a fairly large stack with a spacing of about $\frac{1}{32}$ to $\frac{1}{4}$ inch between the flanges of adjacent trays, the penetration of the flame inwardly from the edge can be limited to a beneficial degree. In addition, the volume of material provided by such a stack serves as a heat sink to minimize localized overheating as a result of transient effects despite the relatively poor heat conductivity of the material.

Generally, the flame should contact and affect the flange for a distance of about $\frac{1}{100}$–$\frac{1}{4}$ inch inwardly from the outer edge depending upon whether the material is oriented or not since excessive deorientation is particularly to be avoided because of the brittleness which may result. Accordingly, with oriented materials, the involvement should be limited to $\frac{1}{100}$–$\frac{1}{16}$ inch, and preferably about $\frac{1}{64}$–$\frac{1}{32}$ inch. As a result of the effect of the heat in producing fusion and/or deorientation, the flange should be physically altered in configuration to provide a bead about 50–150 percent greater in thickness than the unaltered material of the flange adjacent thereto. Such a physical change will normally indicate that the jagged edge and any whiskers or other particles immediately adjacent the edge have been involved to provide the desired smooth surface to the touch. The flame will usually produce fusion of whiskers and other small particles with which it comes into contact and may or may not produce fusion of the edge portions depending upon whether deorientation is relied upon to effect the physical change.

However, since some particles may be disposed on the surface of the flange inwardly of the extreme edge which is most effectively treated by the flame, it may be desirable to subject the flange to a brushing operation. Since it is desirable for the brushing elements to penetrate somewhat inwardly of the abraded outer edge to effect removal of the synthetic plastic particles lying on the surface of the flanges, the brushes preferably employ flexible filamentary or bristlelike elements which will deform about and penetrate between the flanges of adjacent trays to dislodge and propel the particles outwardly therefrom. Bristle brushes have proven particularly advantageous for this purpose, and the bristles may be natural or formed of synthetic plastic such as nylon.

Instead of the apertured brush housings shown in the illustrated embodiment which facilitate the flow of air across the surface of the flanges, it is possible to utilize larger enclosures providing ducts or hoods adjacent the brushing elements which are connected to fans or partial vacuum generating units of sufficient capacity so as to produce the desired air flow across the surface of the flanges. Generally, the illustrated arrangement minimizes the amount of air flow required to achieve the desired purpose and thereby the resultant amount of air which need be treated so as to remove the entrained synthetic plastic particles. In another type of apparatus, positive air pressure may be utilized to blow across the surfaces of the flanges and into a duct or hood to provide a gas stream containing the synthetic plastic particles.

It will be appreciated that various types of conveyors and pusher arrangements may be employed to effect the desired number of the trays through the several stations. The illustrated open mesh conveyor belt is highly desirable because it allows air to flow freely therethrough in addition to providing a heat sink for the stack of trays at the flame treating section. For example, the trays may slide on a fixed conveyor bed and be moved therealong by an overhead pusher unit or the pusher unit may have fingers projecting upwardly through the fixed slide bed. If automatic or semi-automatic operation is not required, trays may be moved manually through the flame treating and brushing stations albeit with some means to avoid contact with the burner.

It can be seen that the present invention readily adapts itself to high speed operation either in conjunction with high speed thermoforming units producing containers for packaging and shipment elsewhere or in line with the actual packaging installations. The method and apparatus used in the practice thereof are relatively economical and are operable independently of the forming equipment so as to provide considerable versatility and adjustability to containers of various configurations and dimensions.

What is claimed is:

1. In a method for treating containers of synthetic plastic material having a laterally projecting flange about at least a portion of the periphery thereof, the steps comprising: cutting a multiplicity of container forms from surrounding plastic material to provide a multiplicity of containers each having a laterally projecting flange about at least a portion of the periphery thereof, said cutting producing edge defects at a portion of said flange; stacking a multiplicity of said containers in nested relationship to provide spacing between their flanges of about $\frac{1}{32}-\frac{1}{4}$ inch; and orienting a flame angularly to said flanges of said stacked containers and causing said flame to contact directly the outer edge of the flanges of said containers for an abbreviated time sufficient for said flame to produce physical changes in the outer edge portion of the flanges and to produce a bead of greater thickness thereat and eliminate projecting portions of synthetic plastic material, said spacing between flanges of adjacent containers and angular disposition of said flame in cooperation with the gas pressure therein substantially limiting penetration of said flame between said flanges and contact with the outer edge portions thereof to about $\frac{1}{100}-\frac{1}{4}$ inch inwardly of the edges thereof.

2. The method in accordance with claim 1 wherein said synthetic plastic material is biaxially oriented and the flame produces deorientation of the outer edge portion of the treated flange.

3. The method in accordance with claim 2 wherein said synthetic plastic is biaxially oriented polystyrene.

4. The method in accordance with claim 1 wherein about $\frac{1}{64}-\frac{1}{32}$ inch of the flange is contacted by the flame.

5. The method in accordance with claim 1 wherein said bead is about 50–150 percent greater in thickness than the unaltered dimension of the flange.

6. The method in accordance with claim 1 wherein the surfaces of said flanges are brushed adjacent said outer edges contacted by said flame subsequent to such flame contact.

7. The method in accordance with claim 6 wherein a gas is caused to flow outwardly across said flanges adjacent said brushed surfaces to minimize contamination of the interior of the containers by synthetic plastic particles.

8. The method in accordance with claim 1 wherein said containers are of generally rectangular cross section and wherein flames are caused to contact flanges along opposite sides thereof concurrently.

9. The method in accordance with claim 8 wherein flames are subsequently caused to contact flanges along the remaining sides of the containers.

10. The method in accordance with claim 9 wherein said synthetic plastic material is biaxially oriented and the flame produces deorientation of the outer edge portion of the treated flange.

11. The method in accordance with claim 9 wherein the surfaces of said flanges are brushed adjacent said outer edges contacted by said flames subsequent to such flame contact.

12. The method in accordance with claim 11 wherein a gas is caused to flow outwardly across said flanges adjacent said brushed surfaces to minimize contamination of interior of the containers by synthetic plastic particles.

References Cited

UNITED STATES PATENTS

| | | | |
|---|---|---|---|
| 2,967,326 | 1/1961 | Collins et al. | 264—80 |
| 2,969,104 | 1/1961 | Schubert et al. | 264–162 |
| 3,000,057 | 9/1961 | Swedlow et al. | 264—234 |
| 3,381,076 | 4/1968 | Govatsos | 264—321 |

ROBERT F. WHITE, Primary Examiner

G. AUVILLE, Assistant Examiner

U.S. Cl. X.R.

264—162, 234, 345